Patented Jan. 19, 1954

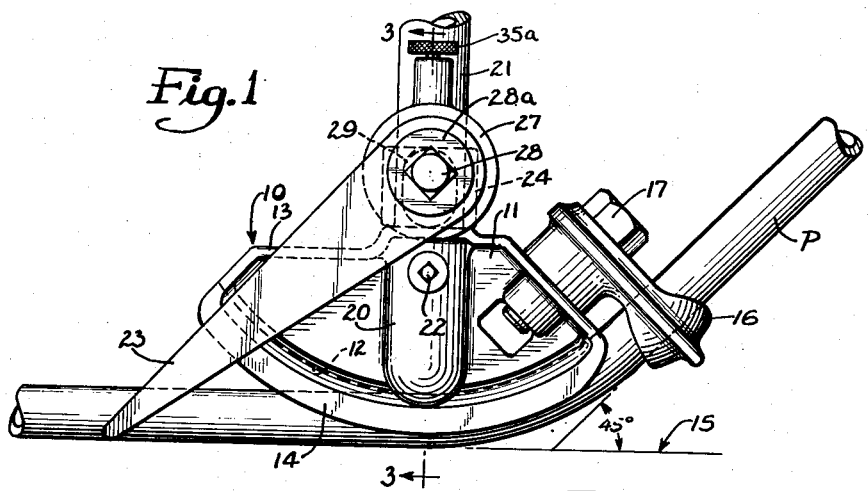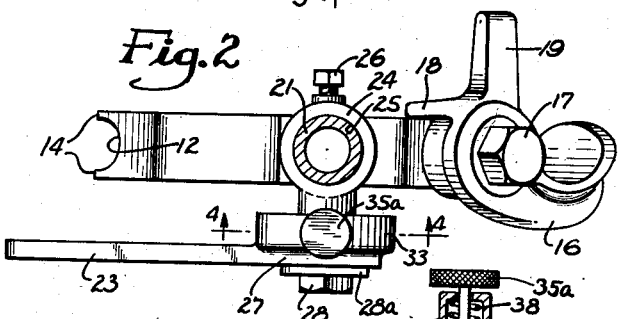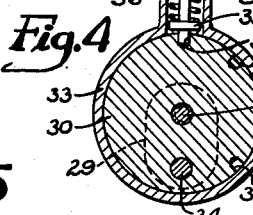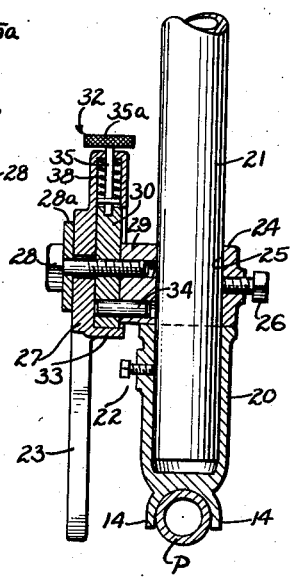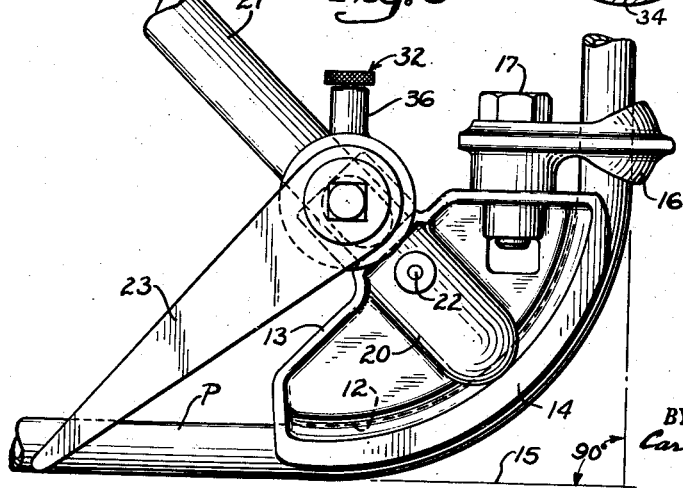
INVENTOR.
Jacob W. Lewin

2,666,351

UNITED STATES PATENT OFFICE 2,666,351

GAUGE STOP FOR PIPE BENDERS

Jacob W. Lewin, Oak Park, Ill.; Lillie E. Lewin, administratrix of Jacob W. Lewin, Application July 26, 1950, Serial No. 176,018

3 Claims. (Cl. 81—15)

The present invention relates generally to hand operable devices for bending pipes, conduits, rods and the like.

One of the objects of this invention is to provide a gauge stop means for use with a hand operable pipe bender of the type with a head having an arcuate groove to receive the pipe and which is rocked to bend the pipe according to the curvature of the groove, the gauge stop means being effective to positively limit the extent of the rocking movement so as to predetermine the degree of bend.

Another object is to provide a gauge stop in the form of an attachment for conventional hand operable pipe benders and which is selectively adjustable to adapt the bender to which it is attached for making accurate bends of different degrees.

A still further object is to provide a device of the above character which is of simple yet rugged construction and which permits of economical manufacture.

The objects of the invention thus generally set forth together with other objects and ancillary advantages are attained by the construction and arrangement shown by way of illustration in the accompanying drawing, in which:

Figure 1 is a side elevation of a pipe bender with a gauge stop embodying the features of the present invention in place thereon, and adjusted to bend a pipe through an arc of 45°.

Fig. 2 is a plan view of the pipe bender and gauge stop shown in Fig. 1.

Fig. 3 is a transverse section taken substantially in the plane of line 3—3 in Fig. 1.

Fig. 4 is a fragmentary sectional detail view taken substantially in the plane of line 4—4 in Fig. 2.

Fig. 5 is a side elevation similar to Fig. 1 but illustrating the relative positions of the elements of the gauge stop and pipe bender as adjusted to bend a pipe through an arc of 90°.

Turning now to a detailed consideration of the drawing, the pipe bender is of conventional form comprising a generally segment-shaped body or frame 10. Preferably, the body has a central web portion 11 integral with a curved or arcuate groove or trough 12 extending along one marginal edge. The remaining marginal edge of the web portion 11 is bordered by a flange 13 which is disposed perpendicularly thereto. In effect the groove 12 is defined by two transversely arcuate flanges 14 extending oppositely from opposite sides of the web portion 11. Thus, the groove 12 has a transversely rounded or substantially semi-circular root surface to receive and generally conform in transverse shape to a section of conduit or pipe P which is to be bent.

When the pipe bender is in normal or most common position of use, the groove 12 opens downwardly for engagement with the pipe P as the latter rests on a suitable working surface, such as a floor 15, and hence may be conveniently designated as being located along the bottom edge of the body 10. The flange 13 follows the configuration of the remaining edge of the body 10, and hence may be conveniently designated as being located generally along the top edge of the body.

While the groove 12 may be of any suitable length, it preferably extends through an arc of approximately 90°.

Means of any suitable character may be provided for confining the pipe P in the groove 12 and for imparting the bending force thereto as the body 10 is rocked lengthwise of the pipe in the bending operation. In the present instance this means comprises a pipe retaining hook 16 which is secured to the body 10 by means of a pivot pin 17, and which is disposed adjacent one end of the groove 12. The hook 16 is arranged to be rocked in a direction transversely of the groove 12 on an axis which is substantially parallel to a tangent at the hook end of the groove.

In use, the hook 16 is first swung out of the way so as to permit insertion of the section of the pipe P which is to be bent into the contiguous end of the groove 12. With the pipe in position, the hook 16 is then swung to engage the portion of the pipe immediately adjacent to and projecting from the groove 12. A lug 18 extends from the hook 16 across one side edge of the flange 13 and is engageable with the latter to define the operative pipe-engaging position of the hook. To facilitate movement of the hook 16 it is provided with a short actuating arm or finger-piece 19 which projects outwardly from the hook in a direction substantially radial of its pivotal axis.

In order to impart the necessary force to rock the body 10 through the desired angle of bend provision is made for attaching a handle thereto by means of which suitable leverage can be attained. To this end, the web portion 11 is formed with a tubular enlargement 20 defining an upwardly opening socket extending substantially radially of the arc of the groove 12. A handle 21 is inserted in the socket, and it is positively secured therein by means of a set screw 22.

In practice, pipes or conduits for different applications may be required to be bent respectively through different degrees or arcs. Heretofore, effecting the required degree of bend by means of benders of the general type herein described has been left largely, if not entirely, to the skill of the workman using the device. Of necessity, therefore, a cut-and-try technique has been used with the attendant inaccurate results that cause a waste of time and frequently a waste of materials. The present invention contemplates the provision of novel gauge stop means for positively and selectively predetermining the degree of bend which will be effected upon operation of the pipe bender, thereby eliminating the guesswork in the actuation of the device and bringing about increased accuracy and speed of operation. Further, the invention contemplates the provision of such novel gauge stop means in the form of an accessory for attachment to pipe benders of the general type herein described.

It is apparent that, after engagement of the hook 16 about the pipe P to lock the latter snug in the leading end of the groove 12, the remainder of the groove in a direction toward the trailing end thereof will curve or recede away from the pipe. Bending is accomplished by rocking the body 10, by means of the handle 21, relative to the normal axis of the straight pipe, and the degree of bend is dependent on the arcuate range of bending movement.

In the illustrative embodiment of the invention, the gauge stop means comprises an abutment finger 23 which is adapted to be carried by the exemplary pipe bender and which is adapted for engagement with the extraneous working surface 15 to limit the rocking movement of the body 10 with respect to the working surface. More particularly, the finger 23 is supported in a position adjacent the trailing end of the groove 12 and in laterally spaced relation to the web 11 and flange 13 so as to engage the working surface 15 after the body 10 of the pipe bender has been rocked through a predetermined angle.

To swingably support the finger 23 on the pipe bender means comprising a pivotal support in the form of a collar 24 is provided which has an axial passage 25 therethrough for the reception of the handle 21 to which it is securely fastened by means of a set screw 26. The finger 23, which is of generally tapered form, terminates at its upper end in an integral circular head 27. The finger 23 is adjustably mounted on the collar 24 by means of a bolt 28 which passes concentrically through the head 27 and is screw-threaded into a boss 29 integral with the collar 24 to form a swivel support defining a pivotal axis generally perpendicular to the handle 21 and to the pipe bending groove 12. Preferably, a bearing washer 28a is inserted between the head of the bolt 28 and the finger head 27.

Detent means is provided to facilitate positioning of the finger 23 so that it will engage the working surface 15 when the desired degree of bend obtains upon operation of the device, which means is also effective to positively lock the finger against turning movement about its pivotal support axis once it has been set. Structurally the detent means includes a positioning disk or anchor member 30 and a detent 32 for coaction therewith. The disk 30 is received within an annular flange 33 formed integral with the head 27 and is interposed between the latter and the boss 29, a central hole being provided therethrough to permit passage of the bolt 28, thus centering the disk with the pivotal axis for the finger 23. The disk is held in fixed relation with respect to the boss 29 by a dowel 34 which is received in registering bores provided therefor in the disk and boss. Since the boss is rigid with the collar 24 and the latter is fast on the handle 21, the disk 30 is, therefore, maintained in fixed relation to the pipe bender body 10.

As shown, the detent 32 comprises a pin 35 having a finger-piece 35a on the outer end thereof and being supported for movement substantially radial of the disk 30 into and out of engagement therewith. In the present instance the detent 32 is supported on a hollow boss 36 which is rigid with the flange 33 on the head 27 and extends radially outward therefrom. The pin 35 extends through the boss for engagement with the edge of the disk 30. Preferably, the disk 30 is provided with a series of spaced sockets 37 in its peripheral edge for the reception of the inner end of the pin 35. As shown in Fig. 4, the internal side walls of the respective sockets extend radially from the pivot bolt 28 to define positive locking surfaces adapted to coact with the pin 35 to positively lock the finger 23 against pivotal movement about the bolt 28. The detent 32 is spring-biased so that the pin 35 is urged inwardly. To this latter end a compression spring 38 is interposed between the boss 36 and a shoulder 39 carried by the pin 35 adjacent its inner end.

When the pin 35 is in engagement with one of the sockets 37, the finger is keyed or locked against rotation about the pin 28 and projects beyond the groove 12 for abutment with the working surface 15 to limit the degree of rocking movement of the body 10. The finger is angularly adjustable in position to vary the degree of bend. In the present instance such adjustment is readily effected by moving the pin 35 against the force of the spring 29 out of engagement with one of the sockets 37 in the disk 30 and then revolving the finger 23 freely into a different angular position as determined by the location of another of the sockets 37.

Within the broad concept of the invention any desired number of positions may be provided. In common practice, bends of 90° and 45° are most usually required. Hence, as best seen in Fig. 4 and for purposes of illustration, the uppermost of the sockets 37 in the disk 30 is located relative to the finger 23 so that with the pin 35 received therein the finger will engage the working surface 15 when a bend of 45° has been effected in the pipe P. The next socket to the right as viewed in Fig. 4 is spaced 45° from the former one and thus is located so that with the pin 35 received therein the finger 23 will engage the working surface 15 when a bend of 90° has been effected in the pipe P. The lowermost of the sockets 37 shown in Fig. 4 is spaced substantially 135° from the uppermost one and with the pin 35 engaged in this socket the finger 23 will be held in an upward, out-of-the-way position adjacent the handle 21.

It will be apparent from the foregoing that a hand implement comprising a pipe bender of the general type described equipped with gauge stop means embodying the features of the present invention is capable of quickly and accurately effecting uniform bends in pipes, conduits or the like to which it is applied since in any of its operative positions the finger 23 of the gauge stop serves positively to predetermine the desired degree of bend. As a result, operation by cutand-try depending on the skill and judgment of the operator is avoided.

I claim as my invention:

1. A gauge stop attachment for a pipe bender including a body member having an open arcuate groove for receiving a section of pipe to be bent and including a handle secured to the body member and extending therefrom generally radial of said groove for rocking the body member lengthwise of the groove in relation to a working surface on which the pipe to be bent may rest during the bending operation, said gauge stop attachment comprising, in combination, a collar having a passage therethrough for the reception of said handle with a set screw therein for retaining the same on the handle, a finger having a generally circular centrally apertured head with an annular flange thereon, a pivot pin received in said head and collar for adjustably supporting said finger, a positioning disk received within said head flange and interposed between said head and collar, said disk being held in non-rotative relation to said collar, a spring-biased detent carried by said flange and engageable with said disk to selectively position said finger with respect thereto, said finger being adapted to project beyond the body member of the pipe bender when the attachment is affixed thereto for engagement with the working surface to limit rocking movement of the body member whereby to predetermine the degree of bend imparted to said pipe.

2. For use with a hand operable pipe bender including a body member defining an open arcuate bending groove and having a handle secured thereto to extend generally radially away from the groove for rocking the body member lengthwise of the groove in relation to a working surface on which the pipe to be bent may rest during a bending operation, a gauge stop attachment mountable on said bender for coaction with the working surface with which the bender is used to limit bending movement to any one of various predetermined angles, said attachment comprising, in combination, a collar having a passage therethrough for the reception of the bender handle, means on said collar for fastening the same on the handle, a swivel support on said collar defining a pivotal axis generally perpendicular to said handle passage in said collar, a movement limiting finger having a generally circular head on one end thereof pivotally mounted upon said swivel support to support said finger to extend radially from said pivotal axis beyond the bender body member, an arcuate anchor member on said collar concentric with said pivotal axis; a plurality of circumferentially spaced, positive retaining sockets defined on said anchor member; and a manually releasable spring biased detent on said finger head engageable with selected ones of said apertures for positively locking said finger in various predetermined angular positions, relative to said collar, against turning movement about said axis.

3. A hand implement for use with a generally straight working surface for bending sections of pipe or tube accurately through any one of a plurality of predetermined angles, said implement comprising, in combination, a bender body defining an outwardly open, arcuate bending groove along one edge thereof; a handle secured to said bender body and extending away from said groove generally in the plane thereof for rocking said body lengthwise of said groove, an adjustable gauge stop comprising first means constituting a pivotal support mounted on said handle and defining a pivotal axis generally perpendicular to the plane of said groove, second means constituting an elongated finger pivoted at one end to said pivotal support and extending radially from said axis beyond said body member, and detent structure concentric with said pivotal axis and including an element stationary with one of said means and defining a series of positive locking surfaces circumferentially spaced about said pivotal axis, and a spring biased, manually releasable detent carried by the other of said means and engageable with any selected one of said locking surfaces for positively locking said finger in various adjusted angular positions relative to said body for terminating bending movement of the implement by engagement with the working surface with which the implement is used.

JACOB W. LEWIN.

References Cited in the file of this patent

UNITED STATES PATENTS

| Number | Name | Date |
|---|---|---|
| 191,133 | Gardiner | May 22, 1877 |
| 390,936 | Windle | Oct. 9, 1888 |
| 468,584 | Symonds | Feb. 9, 1892 |
| 1,425,536 | Neron | Aug. 15, 1922 |
| 1,559,272 | Monaghan et al. | Oct. 27, 1925 |
| 1,640,426 | Pike | Aug. 30, 1927 |
| 1,670,214 | Roche | May 15, 1928 |
| 1,889,239 | Crowley | Nov. 29, 1932 |
| 2,349,525 | St. Clair | May 24, 1944 |
| 2,381,064 | Lewin | Aug. 7, 1945 |

FOREIGN PATENTS

| Number | Country | Date |
|---|---|---|
| 69,706 | Norway | July 16, 1943 |